(No Model.) 3 Sheets—Sheet 1.
H. W. BAKER.
PORTABLE HOUSE.
No. 444,604. Patented Jan. 13, 1891.
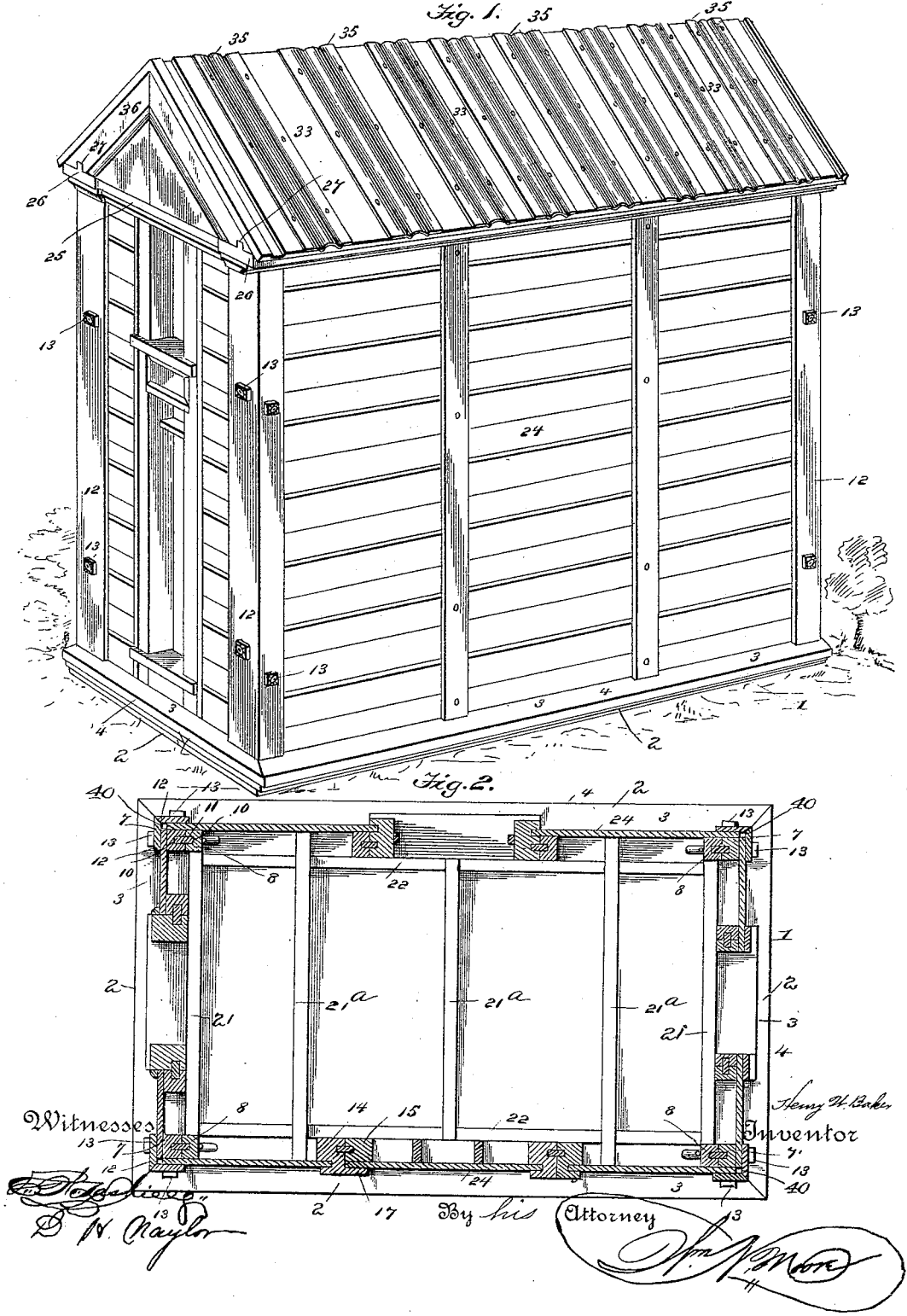

(No Model.) 3 Sheets—Sheet 2.
H. W. BAKER.
PORTABLE HOUSE.
No. 444,604. Patented Jan. 13, 1891.
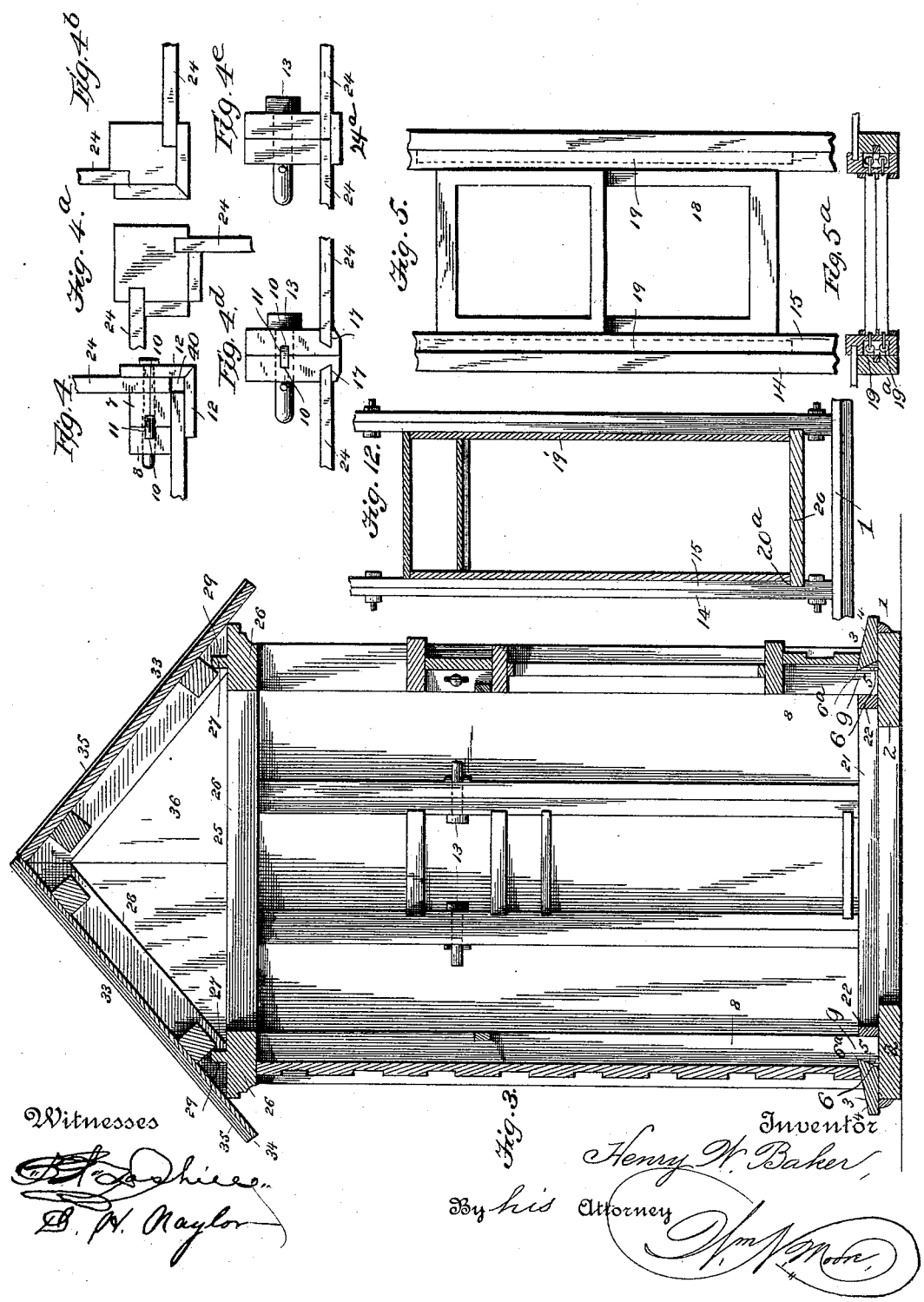

(No Model.) 3 Sheets—Sheet 3.
H. W. BAKER.
PORTABLE HOUSE.
No. 444,604. Patented Jan. 13, 1891.
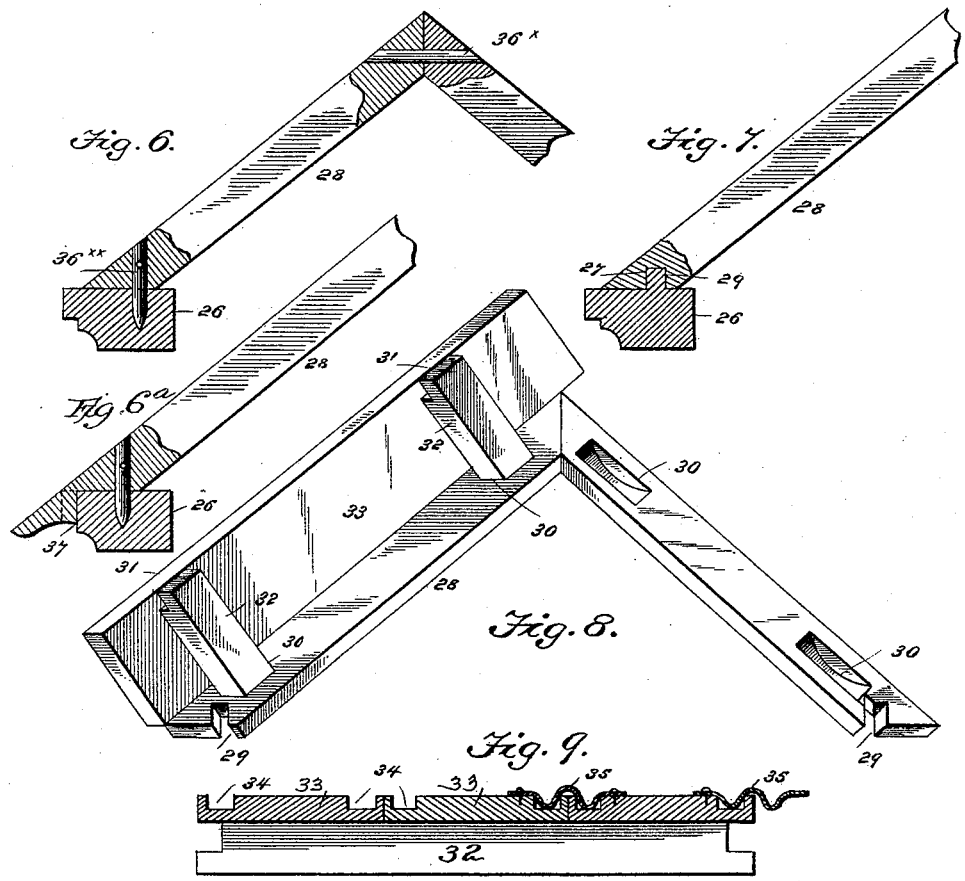
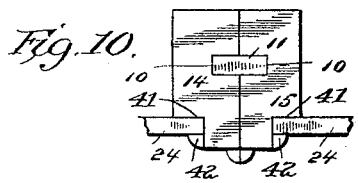
Witnesses
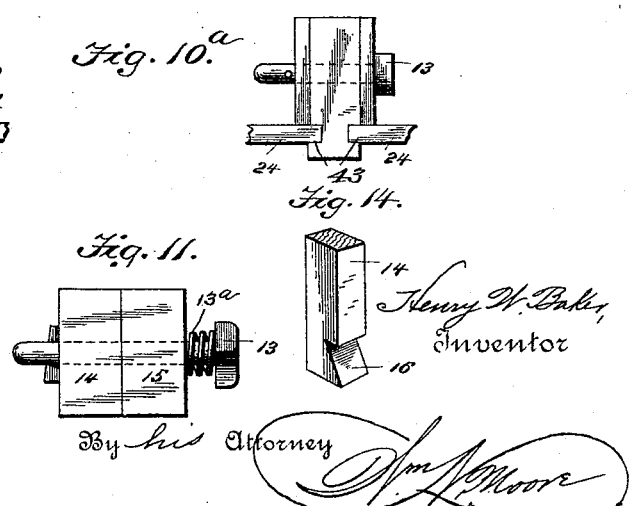
Henry W. Baker,
Inventor
By his Attorney

UNITED STATES PATENT OFFICE.

HENRY W. BAKER, OF KEYSER, WEST VIRGINIA.

PORTABLE HOUSE.

SPECIFICATION forming part of Letters Patent No. 444,604, dated January 13, 1891.

Application filed June 26, 1890. Serial No. 356,829. (No model.)

*To all whom it may concern:*

Be it known that I, HENRY W. BAKER, a citizen of the United States, residing at Keyser, in the county of Mineral and State of West Virginia, have invented certain new and useful Improvements in Portable Houses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in portable houses; and one of the objects of my invention is the provision of a portable house the parts of which are all made by machinery and entirely of wood.

Another object of my invention is the provision of a portable house which will comprise very few parts, and which can be readily put together and taken down, and easily and cheaply transported.

Another object of my invention is the provision of a portable house which can be manufactured at a small figure when compared with other houses of the same character, which will be proof against wind and storm, and which possesses all the features of merit necessary in a portable house.

To attain the desired and necessary objects my invention consists in a portable house embodying the features of construction and arrangement substantially illustrated, described, and specifically claimed herein.

In order that the construction, manner of building, and advantages of my improvements may be readily understood and appreciated, I would invite attention to the accompanying drawings, in which—

Figure 1 represents a perspective view of a portable house constructed in accordance with and embodying my invention. Fig. 2 represents a horizontal section thereof. Fig. 3 represents a vertical transverse section thereof. Fig. 4 is a plan view of the end posts and corner-boards, showing the manner of combining the side boards therewith. Figs. 4$^a$ and 4$^b$ are modifications of the same. Fig. 4$^d$ is a plan view of the side posts, showing the manner of connecting them and combining the side boards; and Fig. 4$^e$ is a similar view of another modification. Fig. 5 represents an enlarged detail view of one of the windows to illustrate how they are secured in the structure. Fig. 5$^a$ is a plan of a section through one of the windows. Fig. 6 is an elevation, partly in section, of one of the inclined roof-bars, showing the manner of connecting thereto the longitudinal roof-timbers. Fig. 6$^a$ is a modification showing the overlapping grooved ends of the inclined bars. Fig. 7 is another modification. Fig. 8 is a perspective view of the inclined roof-bars, showing the manner of supporting the roof-boards. Fig. 9 is a section taken longitudinally along the roof, showing the roof-boards in transverse section and the supporting or locking bar in elevation. Figs. 10 and 10$^a$ are further modifications of the side posts with the side boards. Fig. 11 is a detail view of a spring-pin connection between the parts of the upright posts. Fig. 12 represents the door-frame and its manner of application. Fig. 13 is a perspective view of the lower end of the corner-post, showing the angular lug. Fig. 14 is a similar view of the lower end of the side post.

Referring by numerals to the drawings, in which similar numerals of reference denote corresponding parts in all the views of said drawings, the numeral 1 designates the base of my improved house, which consists of four flat boards, timbers, or pieces 2, Figs. 2 and 3, rigidly secured together at their corners to make a substantial and durable base.

Resting on the base 1 are the four sills or pieces 3, the outer faces 4 of which are downwardly inclined to cause the water to run off, and the inner faces 5 are downwardly or rather inclined inward to form horizontal angular channel 6 between the base and said sills, with an overhanging edge 6$^a$, Fig. 3, the purpose of which will appear.

The corner-joints of my house consist of the two uprights or standards 7 and 8, one of which at its bottom or lower end is provided with an angular lug 9, Figs. 3 and 13, which fits in the channel 6 of the base under the overhanging edge and holds the corner-uprights in place, as is evident. The said uprights form the corner-posts, and are provided on the opposite inner faces with a groove 10, and in the channel provided by said grooves is placed the tongue 11, the purpose of which is to form a perfect seal between the parts and prevent wind and storm from gaining access to the house at the corners.

To the corner posts or uprights are secured the two vertical corner-boards 12, which form the corner proper, by means of the pins, bolts, or the like 13, spaces 40 being left between the vertical corner-boards and the corner-posts, as shown, to receive the edges of the sections, as will appear. The bolts 13 not only serve to secure the vertical corner-boards to the corner-posts, but also hold the parts of the posts together in one direction, and in the other directions the parts of the posts are held from displacement by the tongues 11. These tongues, with the bolts, thus constitute the entire means of connection between the parts of the posts, and consequently the different sections.

The side joints consist of the uprights 14 and 15, which have the channel and tongue fitting therein, and at their lower ends are provided with the angular lugs 16, by which they fit the channel 6 in the base snugly and securely. The side posts 14 and 15 are also provided with the channels 17 to receive the edges of the sections which form the walls of the house, and the parts of the side posts are connected together by bolts, pins, keys, or the like 13, as in Figs. 5 and 5ᵃ. The window-sash are fitted between the side posts, and the inner parts of said posts or parts 15 next the sash are cut out, as at 19, to form boxes for the weights 19ᵃ, Fig. 5ᵃ. The door-frame 19′ is also fitted, as clearly shown in Fig. 12, between the said posts or uprights 14 and 15, with the lower sill 20 thereof fitting in notches 20ᵃ in said posts, as clearly shown. From this construction it will be seen that the angular lugs of the side posts and corner-posts fit snugly in the angular channel 6 of the base and are sustained in place by the overhanging edge and side 5, and to more securely hold the said posts in place I provide the transverse braces 21, which rest against the end side posts and corner-posts, the transverse braces 21ᵃ, and the longitudinal braces 22, which rest against the side posts and have their ends fitting snugly and securely against the braces 21, thus, as will be seen, securely bracing the side and corner posts and preventing them from falling. Between the spaces or the vertical corner-boards 12 and in the vertical spaces or channels 17 of the side posts are received the sections 24 or sides of my house. The sections consist of boards in one piece, which may have the exterior made like siding to give a neat and ornamental appearance to the house. From this construction it will be seen that the side and corner posts are fitted by means of the angular lugs at their lower ends to the channel in the base, are then braced by the transverse and longitudinal braces, and the sections are then slid into the spaces and channels between the corner-boards and side posts, thus making the sides of the house firm on the base.

Supported on the side and end walls of the house is the top 25, which consists of four flat boards or timbers 26, the side boards or timbers having the longitudinal rib or strip 27 projecting upward therefrom, and the inclined roof-supporting bars 28 are provided with angular notches 29, which receive the said ribs or strips 27, and thus retain the inclined roof-supporting bars and also the roof in place on the top. The roof-supporting bars 28 are provided on their sides with the notches or recesses 30, which receive the reduced ends 31 of the longitudinal timbers 32, which support the roof-boards 33. From this construction it will be seen that the roof-supporting bars can be readily and quickly applied and the roof-sections quickly attached to said bars.

Near the meeting ends of the roof-boards are angular channels 34, and over the meeting ends and in said channels are secured the plates of metal 35, which effectually prevent the entrance of storm and wind. The end pieces 36 are secured in place in any desired manner.

In Fig. 6 the roof-bars are secured together by a transverse pin or key 36ˣ at their meeting ends or apex and at their lower ends by a vertical pin or key 36ˣˣ, as shown in Fig. 6ᵃ. The lower end of one of the roof-bars is notched at 37 to engage the edge of the top.

Fig. 4 shows the preferred form of corner-posts and the manner of attaching two parts thereof together with the corner-boards and side sections.

Figs. 4ᵃ and 4ᵇ are modified forms of corner-posts.

Fig. 4ᵈ is a plan view of the side posts, in which the side sections 24 are held in vertical grooves in the posts.

In Fig. 4ᵉ the post has a facing-strip 24ᵃ, which confines the ends of the sections 24.

In Fig. 10, which is a modification of the side posts, the sections 24 are held in notches 41 in the posts and by heads 42, while in Fig. 10ᵃ, which is another modification of the post, the sections are held in grooves 43.

In Fig. 11 I show a form of yielding fastening for the side posts and corner-posts, such yielding action being of importance when the wood swells and contracts, as will be appreciated. This yielding fastening consists of a pin 13, passing through the post, with a spring 13ᵃ interposed between the head and the side of the post.

The house may be provided with a floor in any suitable manner, and may be plastered, if desired.

This being the construction, the manner of building or setting up my improved structure will be readily understood by all acquainted with such matters, but briefly stated is as follows: The parts when collapsed are in compact form, to be easily, cheaply, and readily transported, and when it is desired to set up the structure the base is set in the proper place, the corner and end posts are engaged and secured to the base through the medium of the angular connections, the transverse and longitudinal brace-bars are applied, which firmly secure the corner and side posts, the sections of the walls are fitted to the side and corner posts, the top is placed on the walls, the roof-bars are applied to the top, and the roof is secured to the bars, and when the floors and interior have been made the house is complete.

It is evident that I provide a machine-made house which comprises very few parts, rendering the same strong and durable, proof against the damaging elements, and comparatively cheap. It is also evident that the house can be quickly packed and transported, set up or taken down, and by a few persons. It is also evident that I provide a portable house which presents a neat and attractive appearance, and which will provide a cozy and comfortable home at a very small expense.

One of the most important and vital features of my invention is the channeled base and the corner and side posts having the lower notched ends to interlock with the base, as by this construction the posts which support the sections can be quickly connected to the base and are securely locked thereto, and the structure cannot be damaged by the winds and storm.

Another important feature is the manner of forming the corner and side posts—that is, with the grooves to receive the edges of the board-sections and the grooves in which the tongue is placed. The grooves for the sections prevent them from becoming loose, and the tongue-and-groove connection between the parts of the posts prevents the entrance of wind, snow, or rain, and in fact is proof against the damaging influences of the weather.

Another feature of merit and importance in my invention is the roof-timbers, which are formed with the angular channels, and the metal plates which connect the edges of the timbers and are formed with gutters which enter the said channels. The metal plates are somewhat elastic or yielding, and when the timbers shrink or contract or expand, owing to the changes in the weather, the plates accommodate themselves to the contraction or expansion, and thereby effectually connect the timbers and close the space between the opposing edges of the timbers, as is evident.

Having thus fully described the construction and manner of building my house and defined the points of merit and advantage which it possesses, what I claim as my invention is—

1. In combination, the base having an angular channel 6 extending along it, with an overhanging edge $6^a$, the vertical corner and side posts having angular lugs at their lower ends adapted to fit the channel beneath the overhanging edge, and means for supporting the posts in position, substantially as described.

2. In combination, the base having an angular channel 6, the vertical posts having lugs on their outer sides at their lower ends fitting in said channel beneath its overhanging edge $6^a$, and the braces bearing on the inner sides of the posts and forcing them outward, so that the lugs will fit in the channel, substantially as described.

3. In combination, in a portable house, the base consisting of the flat boards 2, the sills 3, secured thereto, having the inner face 5 inclining from its edge $6^a$ downward and outward and forming an angular channel 6 with the boards 2, the posts having lugs on their outer side adapted to the angular channel, and the means for holding the posts in position, substantially as described.

4. In a portable house, the combination, with the base having the inclined channel formed horizontally therein, the side and corner posts having the lower ends notched to interlock with said channel, the grooves in the inner opposite faces of said posts, the tongue fitting in said grooves, the sections supported and sustained by the said corner and side posts, the top fitting on the posts and sections, the inclined roof-supporting bars secured and supported on the top, said bars having recesses in the sides thereof, the roof-timbers, the strips or bars secured to the under sides of said timbers and having their ends fitting in the recesses in the sides of the roof-supporting bars, and the metal plates connecting the roof-timbers near their side edges, substantially as described.

5. In a portable house, the combination of the base having the horizontally-disposed inclined channel therein, the corner and side posts having their lower ends notched to fit and lock in said channel, the grooves in the outer and inner sides of the posts, the sections fitting in the grooves in the outer faces, the tongues fitting in the grooves in the inner faces, the bolts or keys for connecting the parts of the said posts, the top resting and supported on the posts and sections, the inclined roof-supporting bars supported on said top, the roof-timbers secured to the supporting-bars, and the yielding metal plates connecting the roof-timbers, substantially as described.

6. In a portable house, the combination of the base, the corner and side posts having their lower ends secured to the base, the grooves in the inner and outer walls of said posts, the tongues fitting in the grooves in the inner walls, the sections fitting in the grooves in the outer walls, the springs or yielding keys for securing the posts together, the windows and doors fitted between the side posts, the boxes formed in the side posts, the top resting on the walls and posts, and the roof supported by the top.

In testimony whereof I affix my signature in presence of two witnesses.

HENRY W. BAKER.

Witnesses:
HENRY E. COOPER,
WM. N. MOORE.